April 20, 1954     J. S. DONALDSON     2,675,845
ANTISKID HARNESS AND SLACK-ADJUSTING MEANS THEREFOR
Filed April 14, 1949     3 Sheets-Sheet 1

INVENTOR.
JOHN S. DONALDSON
BY *F. J. Pisarra*
ATTORNEY.

April 20, 1954  J. S. DONALDSON  2,675,845
ANTISKID HARNESS AND SLACK-ADJUSTING MEANS THEREFOR
Filed April 14, 1949  3 Sheets-Sheet 3

INVENTOR.
JOHN S. DONALDSON
BY *F. J. Pisarra*
ATTORNEY.

Patented Apr. 20, 1954

2,675,845

UNITED STATES PATENT OFFICE 2,675,845

ANTISKID HARNESS AND SLACK-ADJUSTING MEANS THEREFOR

John S. Donaldson, Chatham, N. J.

Application April 14, 1949, Serial No. 87,428

7 Claims. (Cl. 152—236)

This invention relates to wheel traction devices and, in its more specific aspects, to antiskid harnesses adapted to be used with pneumatic automobile tires or the like, and to slack-adjusting means for such harnesses and for chains in general.

An anti-skid harness constructed in accordance with this invention comprises a pair of flexible road-engaging members that are substantially equal in length and that are arranged in side-by-side relation. Adjacent ends of the road-engaging members extend through an opening provided in a coupler and are movable to a limited extent relative to each other and to the coupler, as allowed by the opening in the coupler. This permits spreading apart of the road-engaging elements to a sufficient extent intermediate their ends to attain adequate traction when in use.

A device for effecting attachment of the harness to a wheel extends through the opening in each coupler opposite and intermediate corresponding ends of the road-engaging members. When the harness is mounted on a wheel, its parts are stressed in tension and the stresses in each road-engaging member are substantially equal. This eliminates undesirable misalignment of the couplers and consequent abrasion and wear of the tire casing when the harness is employed with a pneumatic tire.

One of the features of the invention resides in the provision of means for taking up the slack in traction devices at the time such devices are mounted on a wheel. This means, as will be apparent from the detailed description that follows, is simple in construction and is adapted to be readily actuated into or out of slack take-up position without the use of tools.

It is a principal object of the invention to provide anti-skid harnesses having improved functional characteristics when in use.

Another object of the invention is to provide an emergency anti-skid harness that is capable of being mounted on or removed from a wheel more quickly and easily than conventional emergency anti-skid devices.

Another object of the invention is to provide a harness of the character indicated that may be readily placed into or out of cooperative engagement with a wheel, such as an automobile wheel, without the use of tools or accessory items of equipment.

Another object of the invention is to provide an emergency anti-skid harness adapted to afford better traction when operatively mounted on a wheel than present-day devices intended to be used for the same purpose.

A further object of the invention is to provide means for readily adjusting the effective length of anti-skid harnesses, chains or the like.

A still further object of the invention is to provide apparatus of the character indicated that is simple and sturdy in construction, reasonable in manufacturing cost and capable of performing its intended functions in an efficient and trouble-free manner.

With the above and other objects in view, the invention comprises the devices, combinations and arrangements of parts set forth in the following detailed description and illustrated in the annexed drawings of preferred illustrative embodiments of the invention, from which the several features of the invention, together with the advantages obtainable thereby, will be readily understood by persons skilled in the art.

Figure 1:
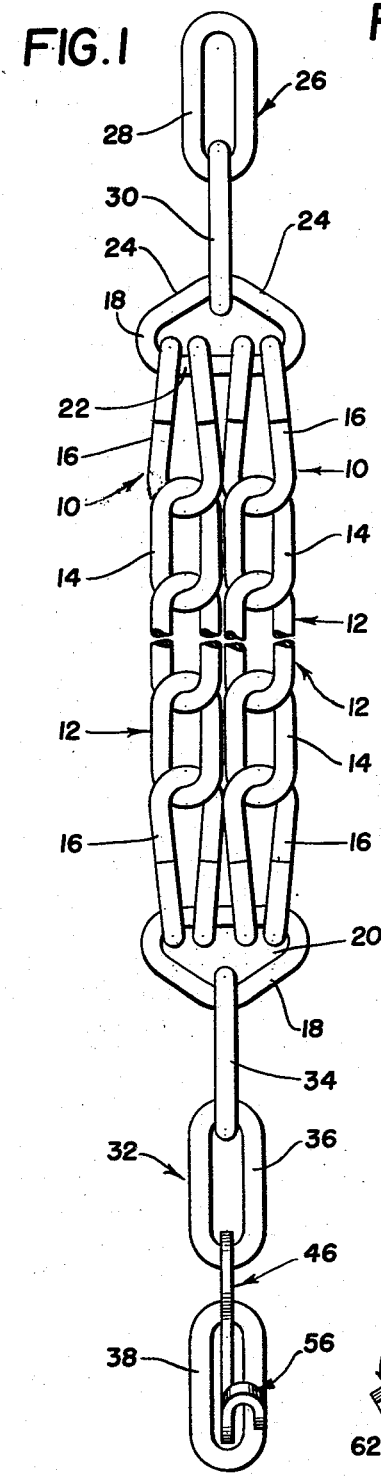
Figure 1 is a view in rear elevation of a recommended form of emergency anti-skid harness constructed in accordance with the invention, with parts, that are duplicates of certain illustrated parts, omitted.
Figure 2:
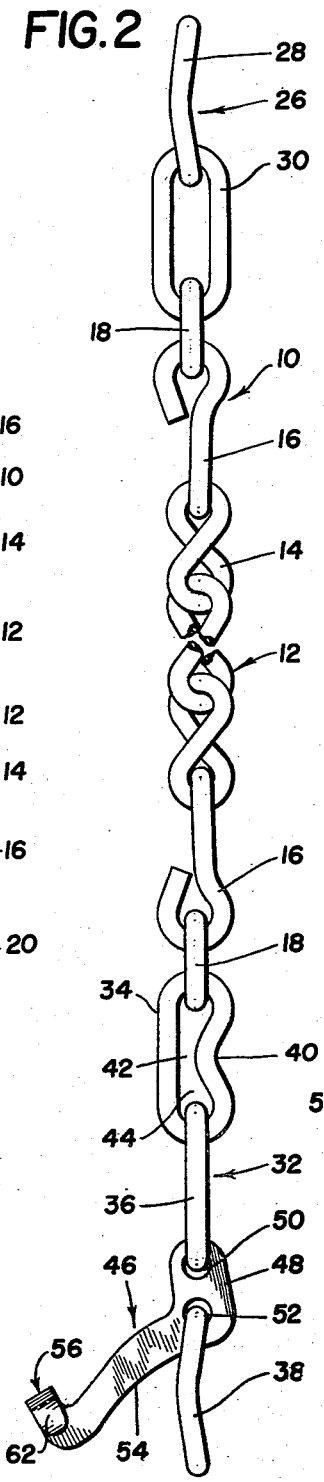
Figure 2 is a view in side elevation of the harness shown in Figure 1.
Figure 3:
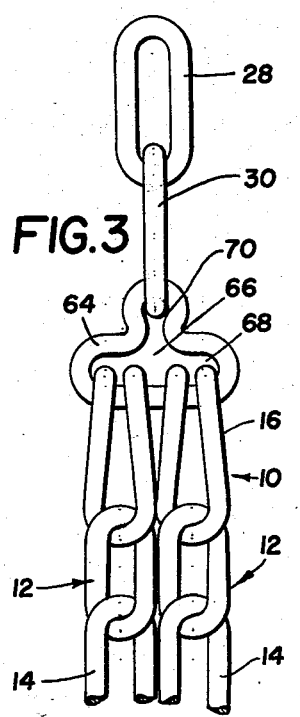
Figure 4:
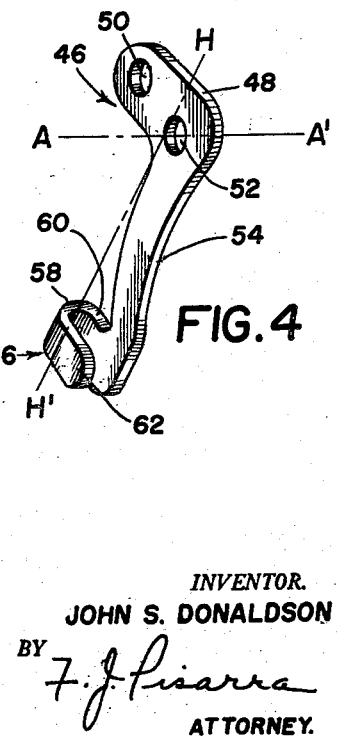
Figure 5:
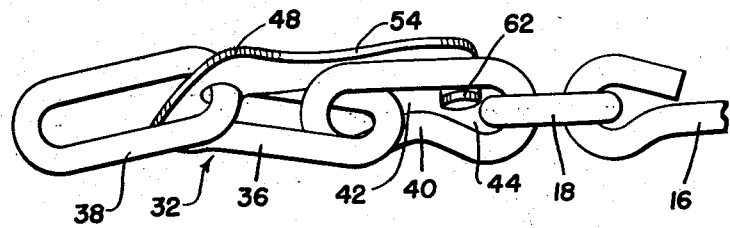
Figure 6:
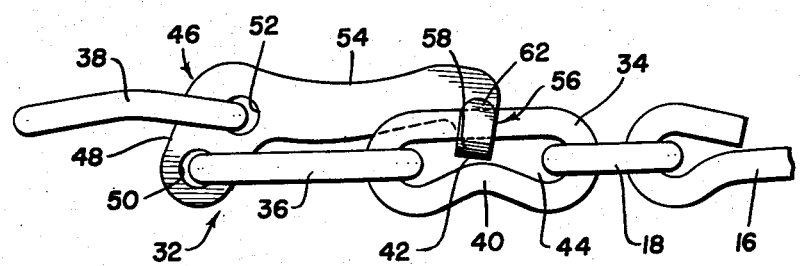
Figure 7:
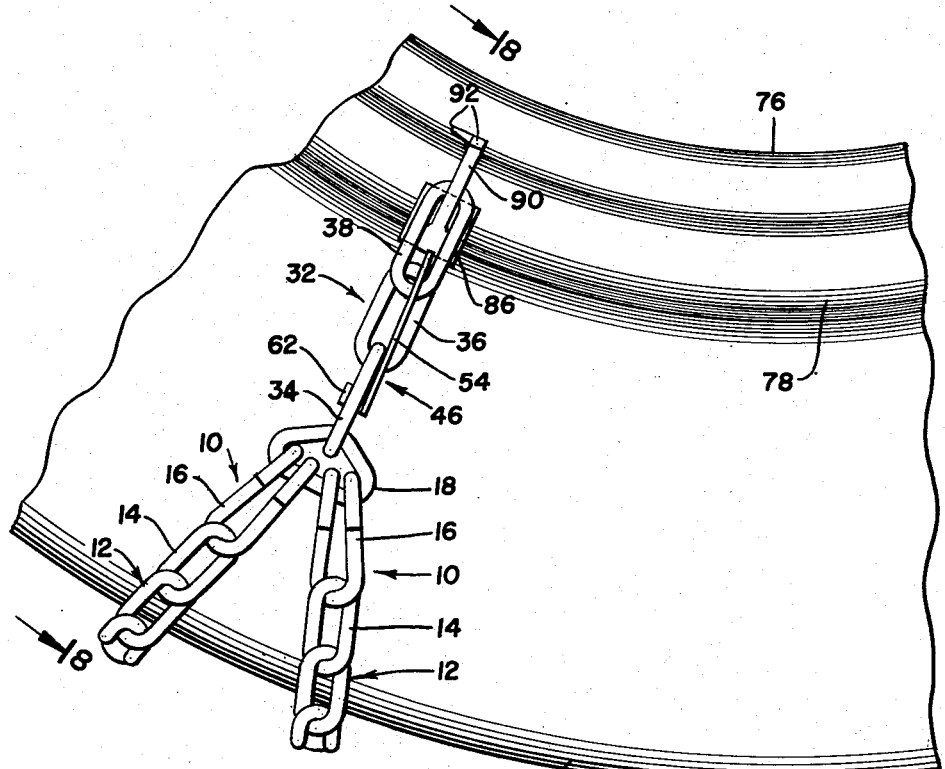
Figure 8:
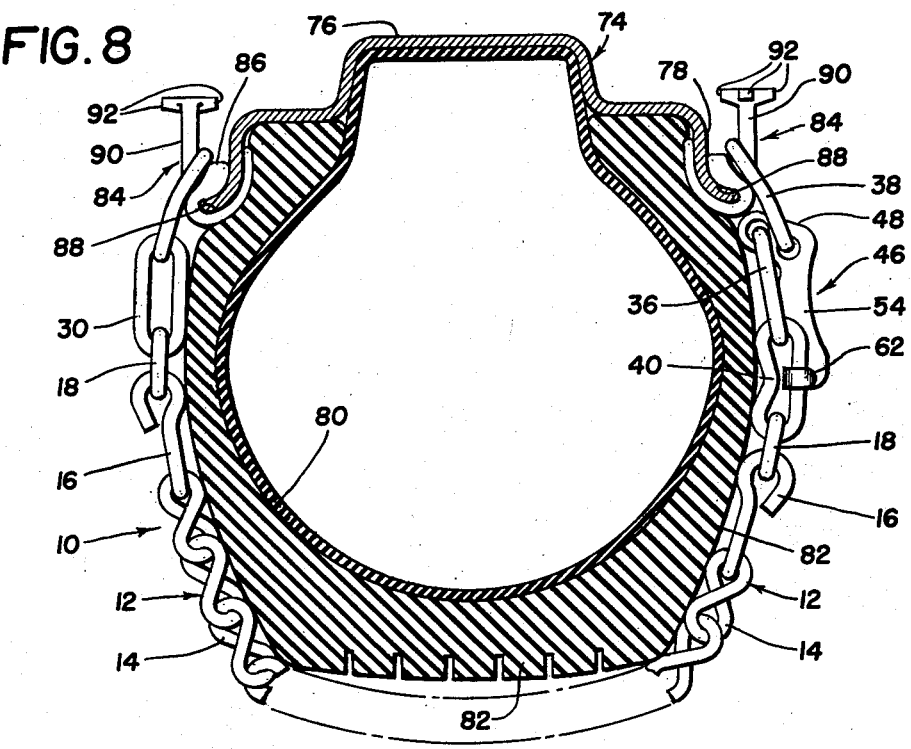

Figure 3 corresponds to the upper portion of Figure 1 and illustrates an anti-skid harness employing a modified form of coupler;

Figure 4 is an enlarged isometric view of a connector that constitutes an element of the apparatus shown in Figures 1 and 2;

Figure 5 is a view of the slack-adjusting means incorporated in the harness shown in Figures 2 and 3, with the parts in one relative position;

Figure 6 is similar to Figure 5 and illustrates another relative position of the parts;

Figure 7 is a fragmentary side view of an automobile wheel having the emergency anti-skid harness of Figures 1 and 2 operatively connected thereto;

Figure 8 is a cross-sectional view taken along line 8—8 of Figure 7; and

Figure 9:
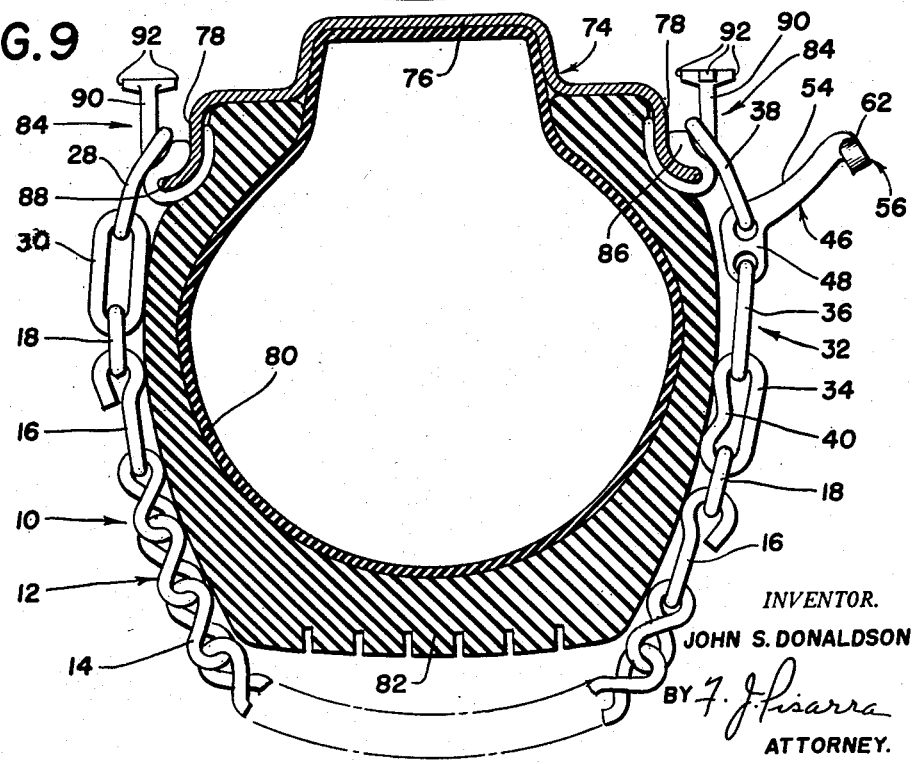

Figure 9 is a view corresponding to Figure 8, certain of the parts being shown in another relative position.

Referring now to the drawings wherein like reference numerals denote corresponding parts throughout the several views, and more particularly to Figures 1 and 2, the anti-skid harness illustrated therein comprises a pair of road-engaging members 10 that are substantially equal in length and are arranged in side-by-side relation. Each road-engaging member 10 preferably consists of a chain 12 made up of a series of conventional traction links 14 and end hook links 16. It will be apparent that the road-engaging members may be made of any suitable flexible material, such as rubber, or may comprise any appropriate form of chain encased in a rubber sheath. The harness includes a pair of couplers or generally triangular links 18, each of which defines an opening 20 and consists of a base portion 22 and side portions 24. As is best shown in Figures 1 and 2, adjacent hook links 16 extend through opening 20 in a corresponding coupler 18 and engage coupler base portion 22. Base portion 22 is of sufficient length to permit restricted relative movement of hook links 16 therealong.

A device, such as a chain 26, is connected to upper coupler 18 and is adapted to cooperate with apparatus to be described further along to effect attachment of harness 10 to a wheel. Chain 26 comprises links 28 and 30, the latter extending through opening 20 of upper coupler 18 and engaging the coupler at the juncture of its side portions 24.

The invention contemplates a means, generally indicated by numeral 32, for taking up the slack or adjusting the effective length of the harness when the same is mounted on a wheel. Means 32 includes a plurality of links, preferably three, which may be termed a planar first link 34, a second link 36 and a third link 38. Link 34 is kinked, as indicated at 40 in Figure 2, to restrict the width of the central portion 42 of the opening 44 defined by that link.

Means 32 also includes a connector 46 that is interposed between links 36 and 38 and is best shown in Figure 4. The connector comprises a plate 48 that is provided with a pair of spaced circular through apertures 50 and 52. Integral and preferably coplanar with plate 48 is an arm 54 that has a U-shaped hook extension 56 at its free end. Hook 56 comprises a web 58 and side elements 60 and 62 that are generally parallel to each other, hook side element 60 preferably being located in the common plane of arm 54 and plate 48.

Referring now to Figure 2, it will be observed that link 36 extends through aperture 50 and is thereby pivotally and tiltably connected to connector 46. Link 38 similarly extends through aperture 52, whereby it is pivotally and tiltably connected to connector 46.

A line A—A' denotes the center line or axis of aperture 52 in Figure 4. This line is also considered as constituting the axis of the pivotal connection between link 38 and connector 46. A corresponding line (not shown) through aperture 50 would constitute the axis of the pivotal connection between link 36 and the connector. A line H—H' identifies the center line of the longitudinal opening defined by hook 56. The elements of the connector are so constructed and arranged that line H—H' is generally normal to line A—A'.

The embodiment of the invention shown in Figure 3 is the same as that illustrated in Figures 1 and 2, with the exception that a coupler or link 64 is substituted for either or both of couplers 18 of Figures 1 and 2.

Coupler 64 comprises a flat link defining a generally T-shaped opening 66 that consists of a horizontal portion 68 and a vertical portion 70. The juncture of the vertical and horizontal portions of opening 66 is of reduced width to prevent entry of either hook link 16 into vertical portion 70, or of link 30 into horizontal portion 68. Thus, it will be seen that coupler 64 maintains adjacent portions of hook links 16 and link 30 in the illustrated relative position.

Figures 7 and 8 illustrate the harness of this invention operatively mounted on a wheel, such as an automobile wheel. The wheel may include a circular rim 74 that is generally U-shaped in transverse cross section and comprises a web 76 and spaced flanges 78. A pneumatic tire, consisting of an inner tube 80 and a casing 82, engages rim 74 in the usual manner.

The harness is adapted to be detachably secured to the wheel through the medium of a pair of preferably identical anchoring members 84 that will now be described. Each anchoring member comprises a body 86 having a longitudinal arcuate through slot 88 adapted to receive a portion of a corresponding flange 78. The opposite surfaces of the body that define slot 88 are so formed and arranged as to effect frictional engagement with corresponding surfaces of the flange when each member is located with respect to its flange, as shown in Figures 8 and 9. Integral with body 86 is an upstanding arm 90 that carries a plurality of laterally projecting, angularly spaced fingers 92 which prevent accidental disengagement of the extreme end links of the harness from the members.

For the purpose of briefly outlining the manner in which the harness is mounted on a wheel, it is first assumed that end links 28 and 38 are slipped over fingers 92 of corresponding anchoring members 90, and the parts are in the relative position shown in Figure 9. It will be understood that the harness is of sufficient overall length, when the parts are in the positions shown in Figures 2 and 9, to permit ready connection of links 28 and 38 with anchoring members 90. With the parts arranged as shown in Figure 9, there is considerable slack in the harness. The apparatus of this invention permits ready adjustment of the effective length of the harness to thereby take up the major portion of the slack and prevent disengagement of either end link from the corresponding anchoring member. This adjustment is effected through the medium of adjusting means 32 and is attained by simultaneously pivoting and tilting connector 46 about its connections with links 36 and 38, whereby the free end of hook element 62 is manually introduced into opening 44 of link 34 (Figure 5). Upon release of connector 46, the weight of the road-engaging members causes links 34, 36 and 38 and connector 46 to assume the relative position shown in Figure 6 or 8, at which time the web of hook 56 is positioned in portion of reduced width 42 of opening 44, and the hook engages the side of link 34 opposite kinked portion 40.

From the foregoing, it is believed that the construction, operation, and advantages of my present invention will be readily comprehended by persons skilled in the art. It is to be clearly understood, however, that various changes in the apparatus set forth above may be made without departing from the scope of the invention, it being intended that all matter contained in the description or shown in the drawings shall be interpreted as illustrative only and not in a limiting sense.

I claim:

1. In means for adjusting the effective length of a chain which includes a plurality of links comprising an elongated planar first link, the width of the opening defined by said first link being restricted intermediate its ends, a second link directly connected to the first link, a third link, and a connector pivotally connected to the second link and to the third link about spaced points, said connector including a hook adapted to engage the first link in the region of the restricted portion of its opening, the pivotal connection between the connector and the third link being located intermediate the other pivotal connection and the hook when the hook is in engagement with the first link and lying to one side of a line that is normal to the axis of the other pivotal connection and extends through the opening in the hook.

2. Means for adjusting the effective length of a chain comprising a plurality of links consisting of a first link, a second link and a third link, said first and second links being directly connected and lying in corresponding planes that are generally normal to each other, and a connector pivotally connected to the second link and to the third link about spaced points, said connector including a hook adapted to engage the first link, said hook comprising a web and a pair of spaced side elements defining a link-receiving opening, one of said pivotal connections being located intermediate the other pivotal connection and the hook, said other pivotal connection lying to one side of a line that is substantially normal to the axis of said one of said pivotal connections and extends through the opening in the hook parallel to the web.

3. Means for adjusting the effective length of a chain comprising a plurality of links consisting of a first link, a second link and a third link, said first link being directly connected to the second link, and a unitary connector consisting of a plate pivotally connected to the second link and to the third link about spaced points, an arm and a hook at the end of the arm remote from the plate and adapted to engage the first link, said hook comprising a web and a pair of spaced side elements defining a link-receiving opening, one of said pivotal connections being located intermediate the other pivotal connection and the hook, said other pivotal connection lying to one side of a line that is substantially normal to the axis of said one of said pivotal connections and extends through the opening in the hook parallel to the web.

4. Means for adjusting the effective length of a chain comprising a plurality of links consisting of a first link, a second link and a third link, said first and second links being directly connected and lying in corresponding planes that are generally normal to each other, and a unitary connector consisting of a plate pivotally connected to the second link and to the third link about spaced points, an arm and a hook at the end of the arm remote from the plate and adapted to engage the first link, said hook comprising a web and a pair of spaced side elements defining a link-receiving opening, one of said pivotal connections being located intermediate the other pivotal connection and the hook, said other pivotal connection lying to one side of a line that is substantially normal to the axis of said one of said pivotal connections and extends through the opening in the hook parallel to the web.

5. Means for adjusting the effective length of a chain comprising a plurality of links consisting of a first link, a second link and a third link, said first and second links being directly connected and lying in corresponding planes that are generally normal to each other, and a unitary connector consisting of a plate permanently and pivotally connected to the second link about a first pivotal axis and permanently and pivotally connected to the third link about a second pivotal axis that is spaced from the first pivotal axis, an arm and a hook at the end of the arm remote from the plate and adapted to engage the first link, said hook comprising a web and a pair of spaced side elements defining a link-receiving opening, said first pivotal axis lying to one side of a line that is substantially normal to the axis of said second pivotal axis and extends through the opening in the hook parallel to the web, said second pivotal axis being located intermediate the first pivotal axis and the hook.

6. In an emergency anti-skid harness for a wheel, a pair of road-engaging members substantially equal in length and disposed in side-by-side relation, a pair of couplers, each coupler having an opening formed therein, adjacent ends of the members extending through the opening in and being movable along a corresponding coupler, and means adapted to effect attachment of the harness to the wheel, said means comprising a chain having one end extending through the opening in and engaging the portion of one of the couplers opposite the portion engaged by the members, said chain including a plurality of links comprising a first link, a second link directly connected to the first link, and a third link, and a connector permanently and pivotally connected to the second link and to the third link about spaced points, said connector including a hook removably engaging the first link, the axis of the pivotal connection between the connector and the third link lying to one side of a line that is normal to the axis of the other pivotal connection and extends through the opening in the hook.

7. In an emergency anti-skid harness for a wheel, a pair of road-engaging members substantially equal in length and disposed in side-by-side relation, a pair of couplers, each coupler having an opening formed therein, adjacent ends of the members extending through the opening in and being movable along a corresponding coupler, and means adapted to effect attachment of the harness to the wheel, said means comprising a chain having one end extending through the opening in and engaging the portion of one of the couplers opposite the portion engaged by the members, said chain including a plurality of links comprising a first link, a second link directly connected to the first link, and a third link, and a connector comprising a plate having a pair of spaced through apertures, an arm carried by the plate, a U-shaped hook secured to the end of the arm remote from the plate and comprising a web and a pair of spaced side elements generally parallel to the plate, said second link extending through and forming a pivotal connection with one of the apertures and said third link extending through and forming a pivotal connection with the other aperture, the axis of said one of the apertures lying to one side of a line that is substantially normal to the axis of the other aperture and extends through the opening in the hook parallel to the web, said other aperture being located intermediate said one of the apertures and the hook.

References Cited in the file of this patent

UNITED STATES PATENTS

| Number | Name | Date |
|---|---|---|
| 1,441,214 | Chism | Jan. 9, 1923 |
| 1,489,067 | Criswell | Apr. 1, 1924 |
| 1,499,913 | Demers | July 1, 1924 |
| 1,529,558 | Staggers | Mar. 10, 1925 |
| 1,619,471 | Hartung II | Mar. 1, 1927 |
| 1,636,633 | Hartung | July 19, 1927 |
| 1,689,120 | Fairhust | Oct. 23, 1928 |
| 1,851,460 | Stahl | Mar. 29, 1932 |
| 2,417,752 | Hayes | Mar. 18, 1947 |
| 2,453,325 | Karstens | Nov. 9, 1948 |
| 2,461,267 | Givens | Feb. 8, 1949 |
| 2,522,150 | Weber | Sept. 12, 1950 |

FOREIGN PATENTS

| Number | Country | Date |
|---|---|---|
| 494 | Australia | Feb. 9, 1926 |